United States Patent
Cawood

(10) Patent No.: US 10,680,425 B2
(45) Date of Patent: Jun. 9, 2020

(54) INTERNAL TETHER FOR LIGHTNING PROTECTION

(71) Applicant: THOMAS & BETTS INTERNATIONAL LLC, Wilmington, DE (US)

(72) Inventor: Matthew D. Cawood, Deleon Springs, FL (US)

(73) Assignee: Thomas & Betts International LLC, Wilmington, DE (US)

( * ) Notice: Subject to any disclaimer, the term of this patent is extended or adjusted under 35 U.S.C. 154(b) by 41 days.

(21) Appl. No.: 16/066,848

(22) PCT Filed: Jan. 24, 2017

(86) PCT No.: PCT/US2017/014654
§ 371 (c)(1),
(2) Date: Jun. 28, 2018

(87) PCT Pub. No.: WO2017/132110
PCT Pub. Date: Aug. 3, 2017

(65) Prior Publication Data
US 2019/0020186 A1   Jan. 17, 2019

Related U.S. Application Data

(60) Provisional application No. 62/287,574, filed on Jan. 27, 2016.

(51) Int. Cl.
*H02G 13/00*   (2006.01)

(52) U.S. Cl.
CPC ............. *H02G 13/80* (2013.01); *H02G 13/00* (2013.01); *H02G 13/60* (2013.01)

(58) Field of Classification Search
CPC ........ H02G 13/00; H02G 13/20; H02G 13/80; H02G 13/40

(Continued)

(56) References Cited

U.S. PATENT DOCUMENTS 1,757,172 A * 5/1930 Cazel ..................... H01Q 9/40
174/4 R
5,073,678 A  12/1991 Carpenter, Jr.
(Continued)

FOREIGN PATENT DOCUMENTS

WO     00/27010 A1    5/2000
WO  2005/025020 A1   3/2005

OTHER PUBLICATIONS

Thompson Lightning Protection, Inc., "Solid Aluminium Spring Point Blunt Tip Air Terminal", Aug. 24, 2011, Retrieved from the Internet: URL:http://www.tlpinc.com/assets/document-library/Alum Spring Point Blunt Tip Air Terminal.pdf.

*Primary Examiner* — Angel R Estrada
(74) *Attorney, Agent, or Firm* — Taft Stettinius & Hollister LLP

(57) ABSTRACT

A one-part or two-part air terminal for protecting a structure against lightning strikes. A flexible adapter, such as a spring, attaches an upper air terminal to a lower air terminal or a one-piece air terminal and base. The flexible adapter allows a flexible engagement between parts of the air terminal and has an internal passageway. A elongate tether couples parts of the air terminal in case the upper air terminal or one-piece air terminal breaks, so as to avoid a broken part from injuring individuals around. The elongate tether may be a ball chain or other type of chain. The elongate tether runs through the internal passageway of the flexible adapter. A base mounts to the one-part or two-part air terminal and mounts the air terminal to the structure. A grounding wire grounds the base to the grounding rod.

20 Claims, 3 Drawing Sheets

(58) Field of Classification Search
USPC ............... 174/4 R, 2, 6, 7, 5 R, 5 SB, 5 SG; 361/117, 220
See application file for complete search history.

(56) References Cited

U.S. PATENT DOCUMENTS

| | | | |
|---|---|---|---|
| 5,638,248 A * | 6/1997 | Fawthrop | H05F 3/04 174/3 |
| 6,307,149 B1 | 10/2001 | Zini et al. | |
| 6,943,285 B2 * | 9/2005 | Chung | H02G 13/00 174/3 |
| 7,265,961 B2 * | 9/2007 | D'Alessandro | H02G 13/00 361/111 |
| 7,495,168 B2 * | 2/2009 | Park | H02G 13/00 174/2 |
| 7,642,454 B2 * | 1/2010 | Waites | H02G 3/0493 174/50 |
| 8,163,993 B2 * | 4/2012 | Gordin | H01R 4/66 174/6 |

\* cited by examiner

INTERNAL TETHER FOR LIGHTNING PROTECTION

CROSS REFERENCE TO RELATED APPLICATIONS

This application is the National Stage of International Application No. PCT/US2017/014654, which designates the U.S., filed on Jan. 24, 2017, which claims the benefit of U.S. Provisional Patent Application No. 62/287,574 filed on Jan. 27, 2016, the contents of all of which are incorporated herein by reference in its entirety.

FIELD OF THE INVENTION

The present invention is generally related to the field of air terminals. More particularly, the present invention relates a one-part or two-part air terminal with a flexible adapter and an elongate tether internal to the flexible adapter for mechanically and electrically coupling and attaching the air terminal in case of breakage while still allowing a flexible engagement between parts of the one-part or two-part air terminal.

BACKGROUND OF THE INVENTION

Lightning is the sudden electrostatic discharge between electrically charged regions of clouds and strikes either other charged regions of clouds or the ground. It is one of the most substantial hazards presented to mankind by the weather, and if it discharges into a house, tower, or other structure, can cause significant damage including injury, fire, structural damage, or, even in the case of a minor lightning strike, substantial damage to electronic devices. Lightning in an area striking the ground naturally tends towards hitting the highest point, whether it is the roof of a building, a tree, a tower, etc.

Based upon this premise, air terminals (or "lightning rods") may be used to protect a structure from damage. Air terminals have historically consisted of a long piece of metal attached to the highest portion of a structure. As these pieces of metal are potentially sharp, they may present a hazard to an individual working around them. Air terminals may also be visually unattractive, as they distract from the lines and the contours of the structure itself, and extend over the structure.

In view of the foregoing, a need exists for an air terminal which is both safe for individuals working around it and is visually appealing.

SUMMARY OF THE INVENTION

The present invention addresses the above needs by providing, in various embodiments, a one-part or two-part air terminal with a flexible adapter having an internal, elongate tether for protecting a structure against lightning strikes. In a first embodiment, the one-part air terminal is connected to a base via the flexible adapter for protecting the structure via receipt and re-direction of lightning strikes and the associated electrical charge. In a second embodiment, the air terminal has an upper air terminal and a lower air terminal connected by the flexible adapter for protecting the structure from lightning strikes. In either embodiment, at least part of the air terminal may be comprised of an aluminum alloy, a copper alloy, or an iron alloy. The base may be mounted to either the flexible adapter or the lower air terminal to mount the one-part or two-part air terminal to the structure. A grounding wire grounds the base. The grounding wire runs over the structure and into the earth.

In the first embodiment, the flexible adapter is an elongate body having a pair of connective ends and a central flexible portion having an internal passageway. An elongate tether, such as a chain, extends through the passageway, mechanically and electrically connected to the connective ends of the elongate body. The flexible adapter is attached to the one-part air terminal at one connective end, and mounted to the base at an other connective end, and the base is, in turn, mounted to the structure. The flexible adapter may attach to the air terminal via a threaded connection of one connective end of the pair of connective ends. The elongate tether may be attached to the connective ends via one or more push mount links.

In the second embodiment, the flexible adapter attaches the upper air terminal to the lower air terminal, the flexible adapter providing a flexible engagement between the upper and lower air terminals. The flexible adapter has an internal passageway. The flexible adapter may be attached to the upper air terminal and the lower air terminal via threaded connections. One of the threaded connections may be male and the other female. Alternately, both the threaded connections may be male or both female. An elongate tether running through the flexible adapter connects the upper air terminal and the lower air terminal and runs through the internal passageway of the flexible adapter.

In either the first or second embodiment, the flexible adapter may be a spring and the internal passageway an internal passageway of the spring. The elongate tether may be any type of chain, such as a ball chain or a twisted link chain. The ball chain may be attached to the upper air terminal via a first push mount link and attached to the lower air terminal via a second push mount link. In addition, the tether may be electrically conductive.

BRIEF DESCRIPTION OF THE DRAWINGS

These and other features, aspects, and advantages of the present invention will become better understood with regard to the following detailed description and accompanying drawings where.

DETAILED DESCRIPTION OF THE PREFERRED EMBODIMENT

Figure 1:
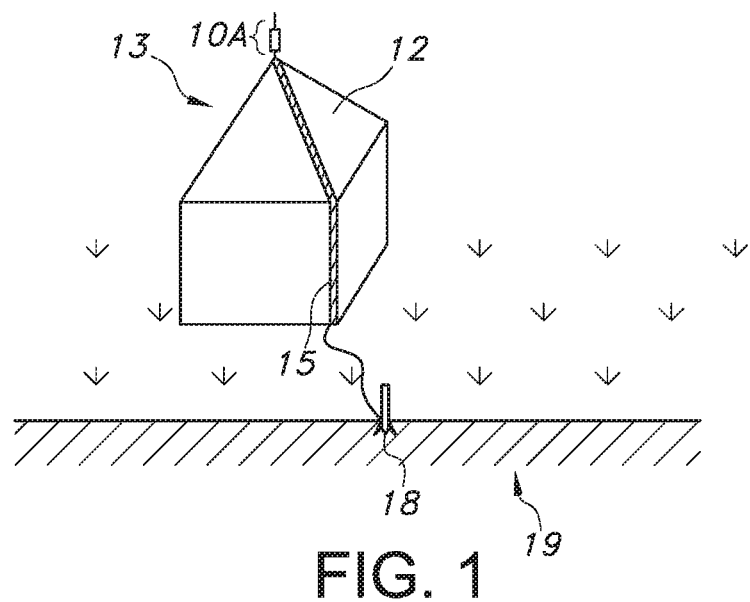
FIG. 1 is an isometric view of an installed two-part air terminal on a structure.

Referring now to the drawings for a better understanding of the present invention, a two-part air terminal of the present invention is indicated in FIG. 1 et seq. by reference numeral 10A and a one-part air terminal indicated in FIG. 1 et seq. as 10B. As displayed in FIG. 1 et seq., the two-part air terminal 10A or one-part air terminal 10B is mounted on top of a house 13 or other structure via a base 29A, 29B. Each base 29A, 29B and air terminal 10A, 10B is connected via a grounding wire 15 to a grounding rod 18 inserted in the ground 19. The grounding wire 15 may run along a back of the house 13, or in some other hidden way. A "structure" as defined herein may be any sort of house, building, stadium, tower, bridge, dam, overpass, ship, or anything else requiring lightning protection. In one example, air terminal 10A, 10B is mounted to the roof 12 of house 13. While one air terminal is shown in each FIG. 1, multiple air terminals 10A, 10B may be installed on a structure. In various embodiments of the invention, at least part of the air terminal 10A, 10B is comprised of an aluminum alloy, a copper alloy, or an iron alloy. The aluminum alloy may comprise a minimum of 90% aluminum, which allows for a reasonable balance of conductivity while avoiding corrosion due to exposure to the elements or caustic fumes such as from a fireplace chimney. The copper alloy may comprise a minimum of 60% copper, which also again allows for a reasonable balance of conductivity while avoiding corrosion.

Figure 2A:
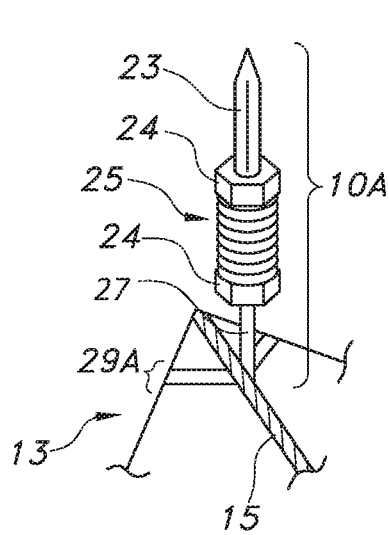
FIG. 2A is a close-up isometric view of the two-part air terminal installed on a structure.
Figure 2B:
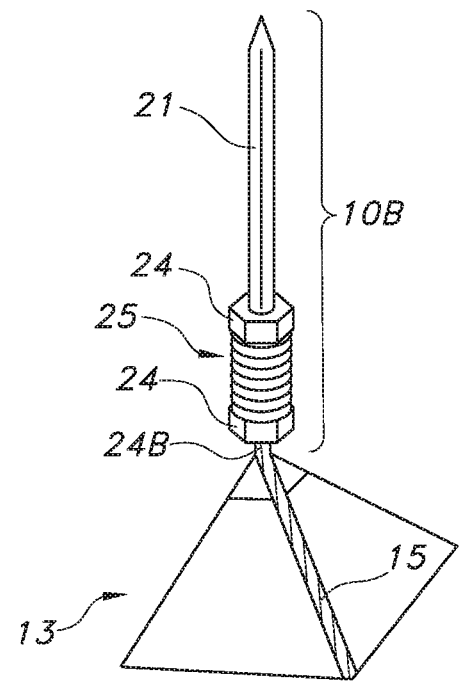
FIG. 2B is a close-up isometric view of a one-part air terminal installed on a structure.

As shown in FIG. 2A, the two-part air terminal 10A has an upper air terminal 23 and a lower air terminal 27 for protecting the house 13 from lightning strikes. A flexible adapter 25 attaches and provides a flexible engagement between the upper air terminal 23 and the lower air terminal 27. The flexible adapter 25 attaches to the upper air terminal 23 and lower air terminals 27 via threaded connections 24. A base 29A mounts the lower air terminal 27 to the house 13. As shown in FIG. 2B, the one-part air terminal 10B has a one-piece air terminal 21 for protecting the house 13 for accepting lightning strikes. A flexible adapter 25 provides a flexible engagement between the one-piece air terminal 21 and a base 29B. The flexible adapter 25 attaches to the one-piece air terminal 21 and the house 13 via threaded connections 24. In an embodiment of the invention, the threaded connections 24 may both be female as displayed in FIGS. 3 and 4. The threaded connections 24 may have a thread size which is ½-13 UNC or ⅝-11 UNC. In an alternate embodiment as displayed in FIGS. 6 and 7, at least one of the threaded connections may be a male thread 24 and the other threaded connection may be a female thread 64. The thread sizes in this embodiment as well may still be ½-13 UNC or ⅝-11 UNC. This presents advantages in terms of ensuring that the air terminal 10A, 10B is assembled correctly, possibly under difficult conditions such as near the top of a tall structure.

The flexible adapter 25 comprises an elongate body having a pair of connective ends 24 and a central flexible portion with an internal passageway 33 therethrough. In various embodiments, such as displayed in FIG. 2A, the flexible adapter 25 allows the upper air terminal 23 or such as displayed in FIG. 2B the one-part air terminal 21 to bend and flex say, for example, if an individual working on the roof 12 of house 13 slips and falls on air terminal 10A or 10B. In such circumstances, the individual who falls on the air terminal 10A or 10B may avoid being impaled, or reduce the severity of an injury, because the flexible adapter 25 allows the upper air terminal 23 or one-piece air terminal 21 to flex and not stay rigid. In the referenced embodiments of the invention shown herein, the flexible adapter 25 is a spring, such as a coil spring.

Figure 3:
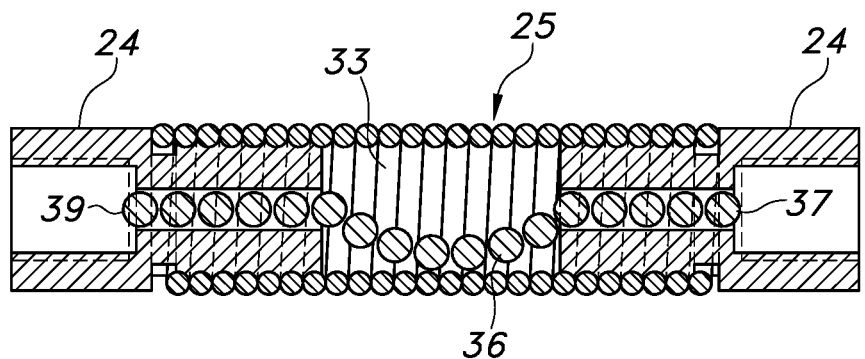
FIG. 3 is a cut-away view of a flexible adapter associated with the one-part or two-part air terminal, in an embodiment of the invention.
Figure 4:
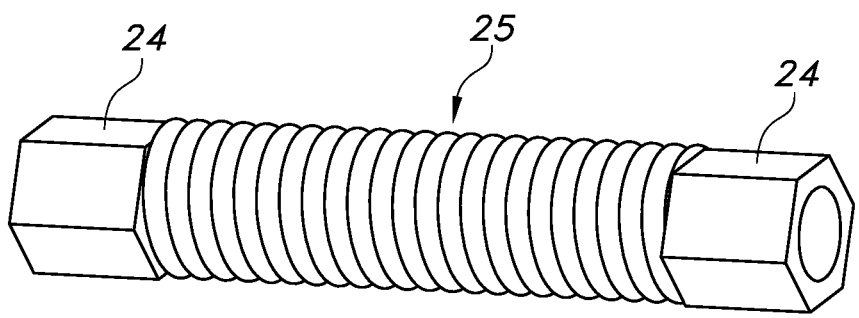
FIG. 4 is a perspective view of a flexible adapter associated with the one-part or two-part air terminal, in an embodiment of the invention.
Figure 5:
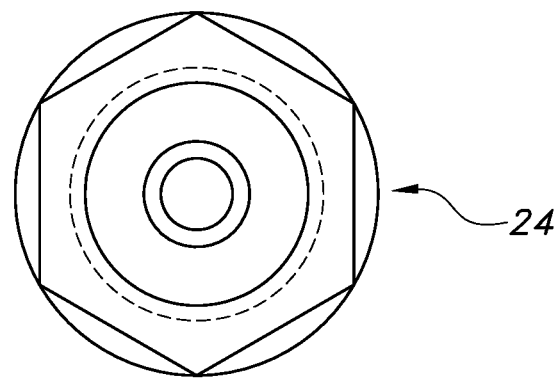
FIG. 5 is a cross-sectional view of a flexible adapter associated with the one-part or two-part air terminal, in an embodiment of the invention.
Figure 6:
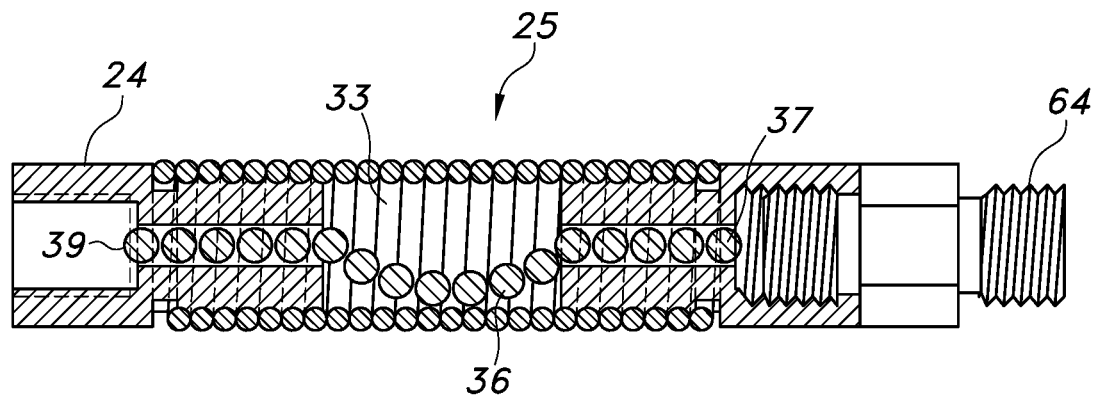
FIG. 6 is a cut-away view of a flexible adapter associated with the one-part or two-part air terminal, in an embodiment of the invention.
Figure 7:
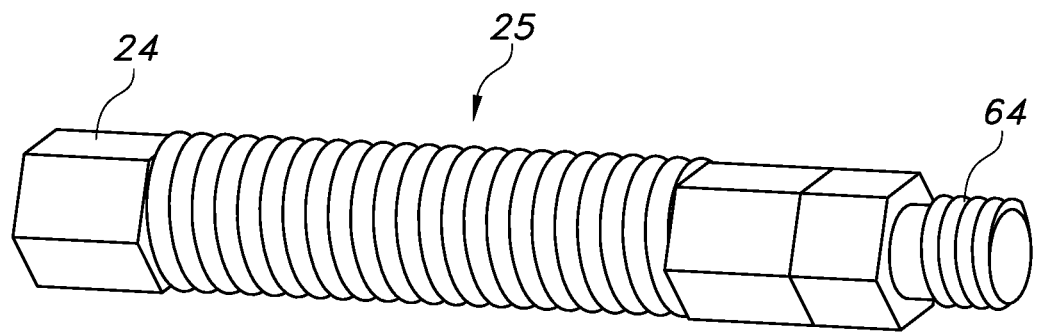
FIG. 7 is a perspective view of a flexible adapter associated with the one-part or two-part air terminal, in an embodiment of the invention.

Further advantages of the flexible adapter 25 of the present invention are now described. A lightning strike at the air terminal 10, may lead to the flexible adapter 25 breaking. If the flexible adapter 25 breaks, the upper air terminal 23 or one-piece air terminal 21 may become a flying projectile, injuring those around and possibly providing reduced lightning protection afterwards. In order to avoid this situation, the flexible adapter 25 has through the internal passageway 33 an elongate tether 36 which connects the upper air terminal 23 and lower air terminal 27 as shown in FIG. 2A or the one-piece air terminal 21 and base 29B as shown in FIG. 2B. In the present embodiment where the flexible adapter 25 is a spring, the internal passageway is the internal passageway 33 of the spring. As shown in FIGS. 3 and 6, the elongate tether 36 may be a ball chain. In a separate embodiment, the elongate tether 36 may be a twisted link chain or other type of chain. In an embodiment of the invention, the elongate tether 36 is attached to the upper air terminal 23 or the one-piece air terminal 21 via a first push mount link 37 and attached to the lower air terminal 27 or the base 29B via a second push mount link 39. The first push mount link 37 and the second push mount link 39 may rely on a push barb, bolt, screw, welding, bracket, or any other means to attach the elongate tether 36. The elongate tether 36 keeps the upper air terminal 23 and the lower air terminal 27 or one-piece air terminal 21 and base 29B mechanically coupled in case the flexible adapter 25 breaks for any reason. One optical feature of the present invention is that in certain embodiments the elongate tether 36 may be electrically conductive establishing additional electrical conductivity between the upper air terminal 23 and the lower air terminal 27 or one-piece air terminal 21 and base 29B. This would allow ground current to flow through these to the base 29A, 29B, grounding wire 15, and into the ground 19 in such circumstances. Since the elongate tether 36 runs internally to flexible adapter 25 in the internal passageway 33, it remains out of sight, and the air terminal 10A, 10B remains as visually appealing as possible.

In view of the above, it will be seen that the several objects of the invention are achieved and other advantageous results attained. As various changes could be made in the above constructions without departing from the scope of the invention, it is intended that all matter contained in the above description shall be interpreted as illustrative and not in a limiting sense.

What is claimed is:

1. A flexible adapter for use with an air terminal for protecting a structure against lightning strikes comprising:
   an elongate body having a pair of connective ends and a central flexible portion with an internal passageway therethrough, wherein the central flexible portion is a spring; and
   an elongate tether extending through said passageway, mechanically and electrically connected to the connective ends of the elongate body.

2. The flexible adapter of claim 1, wherein the elongate tether is a chain running through the internal passageway of the flexible adapter.

3. The flexible adapter of claim 1, wherein at least part of the air terminal is constructed of an aluminum alloy.

4. The flexible adapter of claim 3, wherein the aluminum alloy comprises a minimum of 90% aluminum.

5. The flexible adapter of claim 1, wherein at least part of the air terminal is constructed of a copper alloy.

6. The flexible adapter of claim 5, wherein the copper alloy comprises a minimum of 60% copper.

7. The flexible adapter of claim 1, wherein at least part of the air terminal is an iron alloy.

8. The flexible adapter of claim 1, wherein the air terminal comprises an upper air terminal and a lower air terminal and the flexible adapter attaches and provides a flexible engagement between the upper air terminal and the lower air terminal.

9. The flexible adapter of claim 8, wherein the lower air terminal is mounted to a base which is mounted to the structure.

10. The flexible adapter of claim 1, wherein the elongate tether is electrically conductive to electrically couple the connective ends of the elongate body.

11. A flexible adapter for use with an air terminal for protecting a structure against lightning strikes comprising:
an elongate body having a pair of connective ends and a central flexible portion with an internal passageway therethrough; and
an elongate tether extending through said passageway, mechanically and electrically connected to the connective ends of the elongate body, wherein the elongate tether is a ball chain running through the internal passageway of the flexible adapter.

12. The flexible adapter of claim 11, wherein the elongate body comprises a spring and the internal passageway is an internal passageway of the spring.

13. The flexible adapter of claim 11, wherein the ball chain is attached to the connective ends via one or more push mount links.

14. The flexible adapter of claim 11, wherein the flexible adapter attaches to the air terminal via a threaded connection of one connective end of the pair of connective ends.

15. The flexible adapter of claim 14 wherein the threaded connection has a thread size which is about ½-13 UNC or ⅝-11 UNC.

16. The flexible adapter of claim 14, where the threaded connection is female.

17. The flexible adapter of claim 14, wherein the threaded connection is a male thread and an other threaded connection is a female thread.

18. An air terminal assembly comprising:
an upper air terminal and a lower air terminal for protecting a structure via receipt of lightning strikes;
a flexible adapter attaching the upper air terminal to the lower air terminal, the flexible adapter including a spring allowing a flexible engagement between the upper and lower air terminals and having an internal passageway;
an elongate tether coupling the upper air terminal and the lower air terminal, the elongate tether running through the internal passageway of the flexible adapter;
a base mounted to the lower air terminal mounting the lower air terminal to the structure; and
a grounding wire grounding the base to a grounding rod.

19. The air terminal assembly of claim 18, wherein the elongate tether is electrically conductive.

20. The air terminal assembly of claim 18, wherein the elongate tether is a ball chain.

* * * * *